(No Model.)

J. F. ROUSTON.
LATHE CHUCK.

No. 471,572. Patented Mar. 29, 1892.

WITNESSES
F. Clough.
Dell P. Browne.

INVENTOR
John F. Rouston
By Wells W. Leggett
Attorney

UNITED STATES PATENT OFFICE.

JOHN F. ROUSTON, OF DETROIT, MICHIGAN.

LATHE-CHUCK.

SPECIFICATION forming part of Letters Patent No. 471,572, dated March 29, 1892.

Application filed April 17, 1891. Serial No. 389,276. (No model.)

*To all whom it may concern:*

Be it known that I, JOHN F. ROUSTON, a citizen of the United States, residing at Detroit, county of Wayne, State of Michigan, have invented a certain new and useful Improvement in Lathe-Chucks; and I declare the following to be a full, clear, and exact description of the invention, such as will enable others skilled in the art to which it pertains to make and use the same, reference being had to the accompanying drawings, which form a part of this specification.

Figure 1:
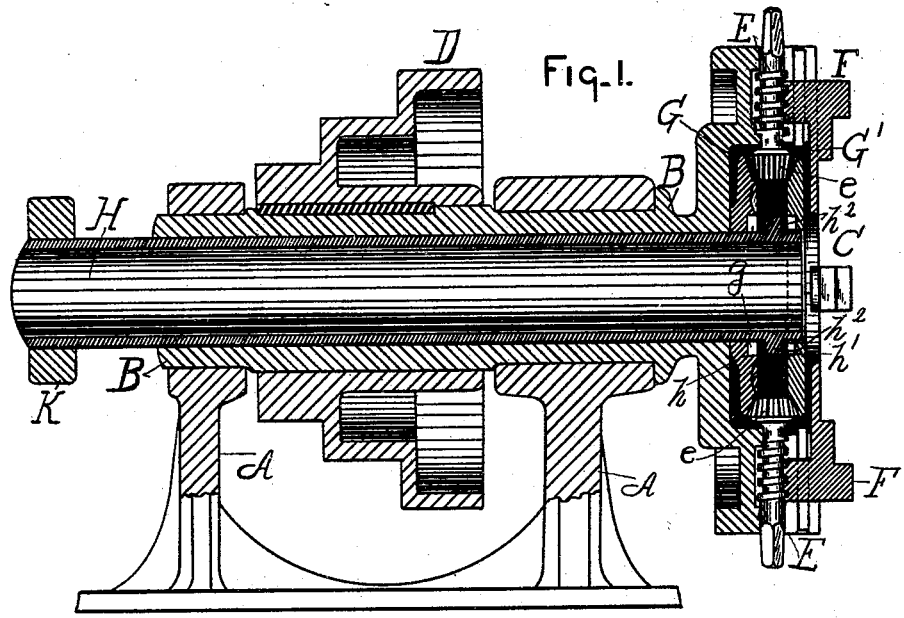
Figure 2:
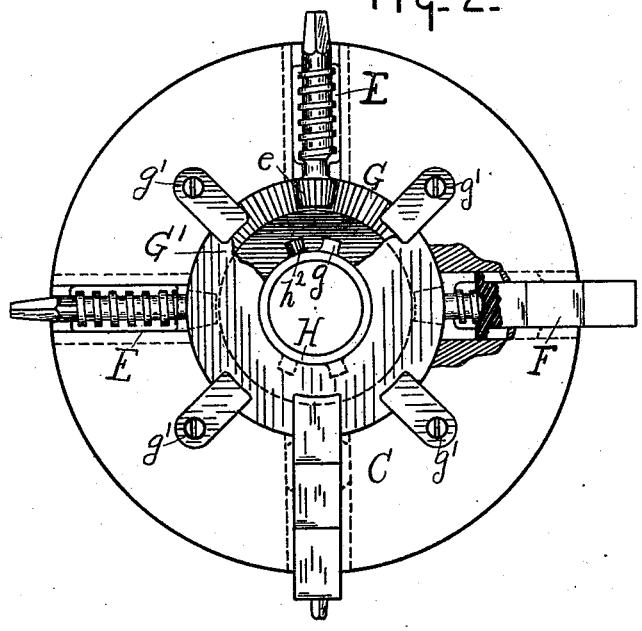

Figure 1 is a view in section of a lathe head and chuck with my invention incorporated. Fig. 2 is a plan of the chuck with parts cut away.

It is the purpose of my invention to provide a chuck for a lathe that can be operated without stopping the lathe and without the use of a wrench or other tool. No successful chuck of this class has heretofore been made, to my knowledge, the successful efforts heretofore having been limited to a chuck that would operate one way without stopping the lathe—that is, that would close on the work or release it, as the case might be. This has been usually accomplished by holding the outer ring of the chuck, and thus operating the jaws by means of suitable mechanism within the chuck. In this class the power is applied by friction, which allows the chuck to move as soon as the jaws have engaged the work. I still retain this feature, but am able to both close and open the jaws with the same mechanism while the latter continues to run in the same direction.

Primarily my invention consists in operating the chuck through and by means of the hollow driving-spindle of the lathe.

In the drawings, A is the frame of the lathe-head, B the spindle, C the chuck, and D the cone-pulley for driving the spindle.

In the chuck the screws E operate the jaws F, as in an ordinary chuck, and are provided with a square head extending out through the chuck for operating it with a wrench when desired. At the inner extremity of the screws E and mounted thereon are bevel-pinions $e$. These pinions engage in common with the geared rings G G', mounted on each side of the pinions. Extending through within the hollow spindle B is the tube or hollow shaft H. This hollow shaft extends through the chuck and forms a bearing at $h$ and $h'$ for geared rings G G' and is provided between these rings with one or more teeth $h^2$, adapted to engage with similar teeth $g$ on the inner faces of the rings G G'. The hollow shaft H has a longitudinal movement limited by the rings G and G'. On the opposite end of this shaft is mounted the hand-wheel K. The ring G' is held in place by the lugs $g'$ or by any suitable means.

The operation of my invention is manifest, and is as follows: Normally the hollow shaft H runs with the spindle and chuck, but may be held by hand-wheel K and may be moved longitudinally by it. By grasping the hand-wheel and moving it in the direction of the chuck the teeth $h^2$ will engage with the teeth $g$ on the ring G', and if the hand-wheel be stopped it will cause the ring G' to stop with it, and if the chuck be revolving it will revolve each of the pinions $e$ and screws E, and thereby cause the jaws F to open or close, according to the direction the chuck is revolving, or, we will say, will close the jaws onto the work, and with a force in proportion to the grip on the hand-wheel. Now if we desire to open the chuck while the lathe is running in the same direction the hand-wheel is thrown in the opposite direction, when the teeth $h^2$ will disengage from the teeth $g$ on the ring G' and will engage with the teeth $g$ on the ring G, and if the hand-wheel be stopped the ring G will stop and cause the pinions $e$ and screws E to revolve and open the jaws F.

The operation of the chuck in the manner described is very simple, and as the movement of the hand-wheel sidewise is very slight it consists in applying the friction to the hand-wheel to first one side and then the other to open and close the chuck. In this case I show only an ordinary hand-wheel as a gripping device for operating the chuck; but any device may be used, operated from any point, and in large lathes in which it would be impracticable to reach the front of the chuck with one hand and the hand-wheel with the other, or in a case where the hand would not have sufficient strength to operate a large chuck, power devices can be used, and a double clutch to shift and clutch the hollow shaft H can be used, and I reserve for later applications claims for such devices wherever the same are suggested herein.

I am aware that it is common to use in chucks one geared ring for simultaneously operating the jaws; but I am not aware that two rings have ever been used for the purpose of operating the jaws in both directions, and I desire to secure that particular feature. Neither am I aware that a shaft extending through the spindle for operating the chuck has ever been used, and I desire to secure this special feature.

What I claim is—

1. In a lathe-chuck, the combination of movable jaws for engaging the work, screws for operating said jaws, pinions mounted on said screws, two geared rings engaging with and connecting said pinions, whereby said pinions are caused to revolve together, and a shaft extending through the driving-spindle and adapted to be engaged with either of said geared rings at the will of the operator, substantially as and for the purposes described.

2. In a lathe-chuck, the combination of movable jaws for engaging the work, screws for operating said jaws, pinions mounted on said screws, and two geared rings engaging with and connecting said pinions, whereby said pinions are caused to revolve together, said geared rings mounted on a shaft extending through the spindle of the lathe, said shaft provided with one or more teeth between said rings, adapted to be engaged with lugs on said rings at the will of the operator, substantially as and for the purposes described.

3. In a lathe, the combination of a chuck and hollow spindle and a shaft extending through the hollow spindle and movable endwise and provided with a lug adapted to engage with either the opening or closing mechanism of said chuck, the said shaft being adapted to revolve normally with the chuck and spindle and to open or close the chuck-jaws by an endwise movement of the same, the lug and operating mechanism being engaged and held from revolving, substantially as and for the purpose described.

In testimony whereof I sign this specification in the presence of two witnesses.

JOHN F. ROUSTON.

Witnesses:
CHARLES H. FISK,
MARION A. REEVE.